ROGER H. LAPP
ARTHUR F. HOGREFE
INVENTORS

ROGER H. LAPP
ARTHUR F. HOGREFE
INVENTORS

ATTORNEYS

United States Patent Office 3,090,197
Patented May 21, 1963

3,090,197
INDUCTIVE LINK INFRARED FIRE DETECTION AND WATER INJECTION SYSTEM
Roger H. Lapp and Arthur Frederick Hogrefe, Silver Spring, Md., assignors to the United States of America as represented by the Secretary of the Navy
Filed Aug. 8, 1961, Ser. No. 130,197
10 Claims. (Cl. 60—35.6)

This invention relates generally to fire detecting and extinguishing means; more particularly, it relates to a fire extinguishing system for monitoring the propellant grain of a missile rocket motor.

When carried on shipboard, missiles are generally movably stowed in an upright position in magazines. Inadvertent or accidental ignition of the propellant grain of a missile rocket motor could cause damage to the magazine structure and to adjacent missiles, creating a hazardous condition endangering the safety of the ship's personnel. A system for monitoring the propellant grains of a plurality of stored rocket motors and for actuating a water injector upon detection of combustion in a propellant grain would substantially reduce the potential hazard described above.

It is therefore an object of the present invention to provide a detector for detecting combustion in the propellant grain of a rocket motor.

Another object of the invention is to provide a water injection system responsive to a signal from the detector for extinguishing combustion in a propellant grain.

A further object of the invention is to provide a fire detector which is light in weight and can be mounted within a rocket exhaust nozzle.

Still another object of the invention is to provide a fire extinguishing system for monitoring the propellant grains of a plurality of missile rocket motors movably stowed in a magazine.

Yet another object is to provide a fire extinguishing system requiring little current to maintain it in monitoring condition.

Still a further object of the invention is to provide a fire extinguishing system which is immune to sunlight and to artificially produced light in the vicinity of the missile magazine.

Yet another object of the invention is to provide a fire extinguishing system having a plurality of water nozzles for monitoring a plurality of rocket motors, wherein only the particular water nozzle associated with an inadvertently ignited rocket motor is actuated.

Other objects and many of the attendant advantages of the present invention will be readily appreciated as the same becomes better understood by reference to the following detailed description when considered in connection with the accompanying drawings, wherein.

Generally, the invention comprises an infrared detector having a short reaction time, mounted in the exhaust nozzle of each missile. A normally closed water injection nozzle, fixed in a stationary structure beneath the missile magazine and directed toward each exhaust nozzle, is actuated by a signal from the detector. Since the missiles are indexed when it is desired to remove one of them from the magazine, it would be impractical to require that each detector be physically connected to the actuator of the water injection nozzle over which it is positioned. Induction coils are therefore provided in the exhaust nozzle for each missile and in the stationary structure beneath each water injection nozzle so that when the coils are aligned, the detector in the exhaust nozzle is electrically connected to the actuating means of the water injection nozzle.

Figure 1:
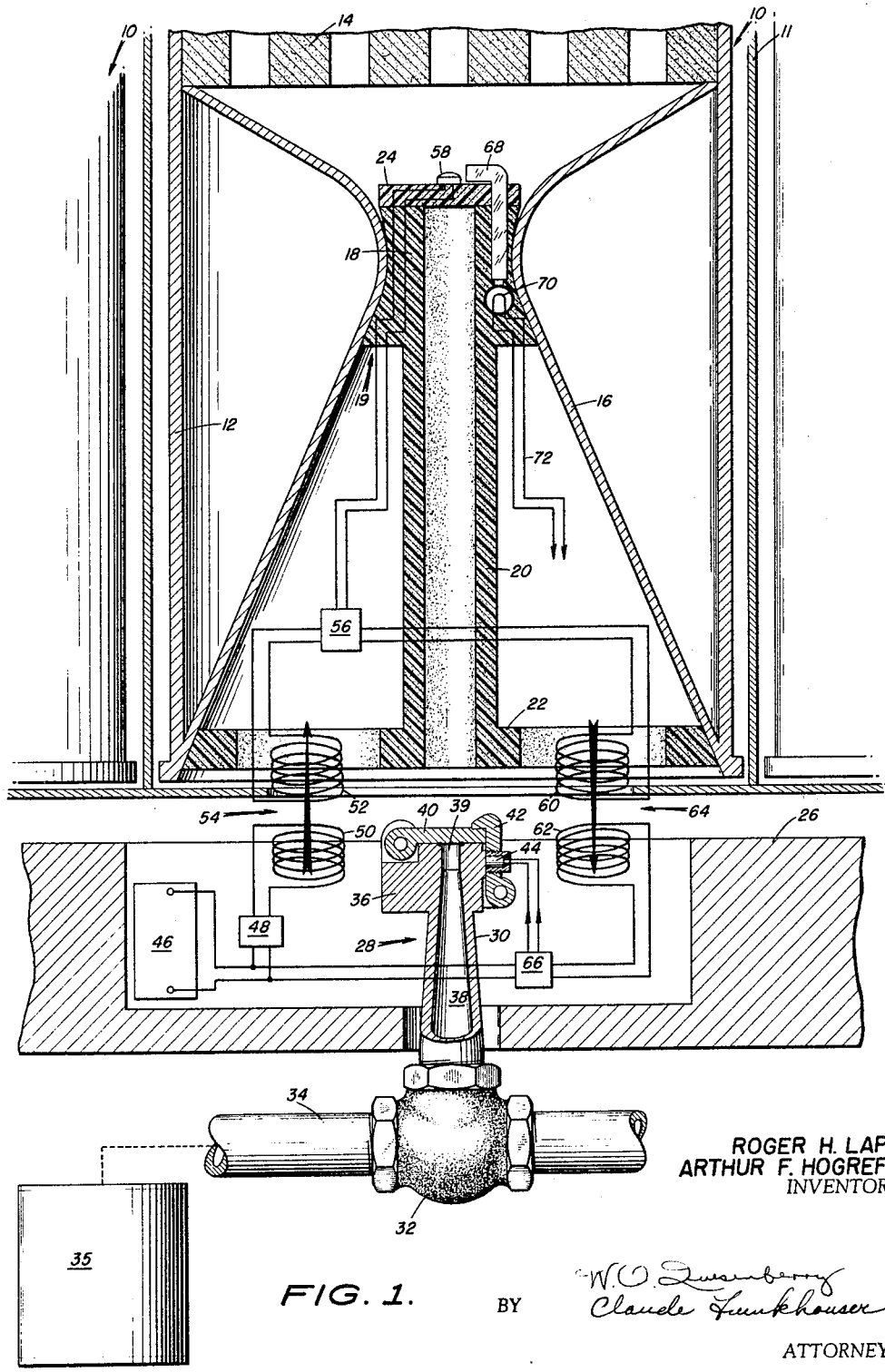
FIG. 1 is a diagrammatic sectional view of a rocket motor exhaust nozzle with the fire extinguishing system of the present invention shown associated therewith.

Referring to FIG. 1, a missile 10, which is one of a plurality of missiles, is shown stored upright in a magazine 11. Each missile includes an outer casing 12, a solid propellant grain 14 housed therein, and a convergent-divergent exhaust nozzle 16 extending from the grain 14 to the aft end of the casing 12. A hollow tapered plug 18 of a Styrofoam nozzle closure 19 is force fitted into the throat of the exhaust nozzle 16. Integral with the plug 18 and extending axially thereof toward the aft end of nozzle 16 is a hollow cylinder 20 having a radial extension ring 22 at the outer end thereof. The extension ring 22 is seated against the tapered wall of exhaust nozzle 16 substantially at the outer extremity thereof. The inner end of plug 18 is provided with a frangible cap 24 to seal the propellant grain 14 from light and moisture.

Each missile is positioned over a stationary magazine base 26 through which extends a water injection nozzle 28 axially aligned with the hollow plug 18 and cylinder 20 of the nozzle closure 19. The injection nozzle 28 comprises a tapered section 30 connected at its lower end by a suitable coupling 32 to a water main 34, which is connected in turn to a pressurized water supply source 35 (shown diagrammatically). Integral with the upper end of the tapered section 30 is an enlarged body portion 36 having a flat surface facing the exhaust nozzle 16. A nozzle bore 38 extends through the tapered section 30 and terminates in a discharge opening 39 at the flat surface of body portion 36. A clapper valve 40 is pivotally mounted at one end of the body portion 36 to normally close the sealed discharge opening 39 of the bore 38. A latch 42 is pivotally mounted on the side of body portion 36 opposite the clapper valve mounting to hold the valve 40 in closed position against the force exerted by water under pressure in the nozzle bore 38. The latch 42 carries an electrically actuated primer 44, which upon firing opens said latch to release the valve 40, as is well known in the art.

Housed in the magazine base 26 adjacent the water nozzle 28 is a battery 46. An oscillator circuit 48 is connected between the battery and an induction coil 50 mounted in the base 26 and extending slightly thereabove. A coil 52 is mounted, as by potting, in the extension ring 22 such that it will be vertically aligned and axially spaced from coil 50 when the missile 10 is stored in its magazine compartment. The coils 50 and 52 form an inductive power link 54 for supplying power to a detector circuit 56. Connected in the circuit 56 is an infrared sensitive photo conductive cell 58 which is embedded in the frangible cap 24 facing the rocket propellant grain 14. The cell 58 may be any suitable type, but in this embodiment it is a cadmium selenide detector. A single cell is shown in the drawing but a plurality of cells connected in parallel may be used if desired.

A coil 60 is connected to the detector circuit 56 and is shown mounted in the radial extension ring 22 diametrically opposite the coil 52 although the coils are not restricted to this position. A coil 62 is housed in the base 26 and extends slightly thereabove so that it is vertically aligned and axially spaced from coil 60 when the missile 10 is stored in its magazine compartment. The coils 60 and 62 form an inductive signal link 64 for supplying a signal to a primer firing circuit 66, which circuit is connected to the battery 46 and to the primer 44. Since the primer employed requires only a small amount of energy for operation, the power requirement of the circuitry of the system should be low.

In order to test the system, an inverted L-shaped rod 68 formed of a light conducting material such as Lucite is embedded in the nozzle closure plug 18 and cap 24, so that the upper, horizontal end of the rod is adjacent the cell 58. Also embedded in the plug 18 is a lamp 70 positioned adjacent the lower end of rod 68 and provided with conductors 72, which can be connected to a source of electrical energy when it is desired to test the system. The light emitted by the lamp 70 is conducted through the rod 68 to energize the detector cell 58. It is a simple matter to then test the system with suitable meters to determine whether it is functioning properly. Of course, prior to connecting the lamp 70 to a power source, the primer firing circuit would be disabled.

Figure 2:
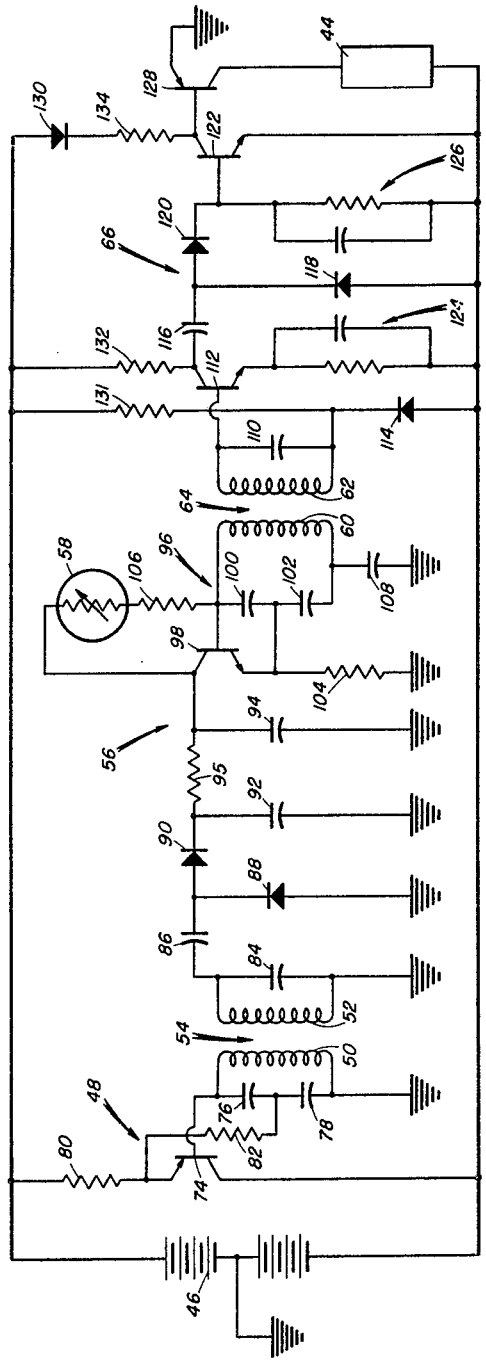
FIG. 2 is a wiring diagram of the electrical circuit of the present invention.

Referring to FIG. 2 for a more detailed description of the circuit utilized in the present invention, the battery 46 supplies power to a conventional Colpitts type of oscillator circuit 48 employing a transistor 74 and a tank circuit comprising capacitors 76, 78, and coil 50. A resistor 80 is provided in the emitter lead to the transistor 74 to develop the emitter input, and a resistor 82 is provided in the feedback line to aid in determining the feedback voltage.

The output of the secondary tuned circuit of the inductive power link 54, consisting of coil 52 and a capacitor 84, is passed through a coupling condenser 86 and a half-wave rectifier voltage doubler, consisting of diodes 88 and 90. A conventional filter circuit, consisting of capacitors 92 and 94 and a resistor 96, receives the output of the diodes 88 and 90 and supplies D.C. to the detector cell 58. The photocell detector 58 provides bias current for a Colpitts type of oscillator circuit 96 utilizing a transistor 98 and including a coil 60 and capacitors 100 and 102 in its tank circuit. A resistor is connected in the line from the emitter of the transistor 98 to ground to order to develop the emitter input. Both capacitors 100 and 102 of oscillaor 96 are of the same value in order to provide for self-bias operation, as opposed to the usual oscillator where just enough feedback is utilized to sustain oscillation. A greater voltage is supplied to the transistor 98 than that required in order to increase the sensitivity of the photocell 58, since current therethrough is directly related to the voltage. This does not have a harmful effect on the transistor 98 since the current supplied is maintained at a low value.

In the monitoring state with no illumination present, the resistance of detector cell 58 is very high, and transistor 98 is cut off except for the current in its collector plate. In this condition, the current drain is very slight. When the detector cell 58 senses illumination, its resistance drops and bias current is supplied to the oscillator 96, which is then self-biasing and independent of photocell action. A resistor 106 is placed in series with the detector cell 58 to prevent the base of the transistor 98 from being raised to a high voltage level under conditions of intense light. Because of the high impedances involved, the voltage supplied to the transistor 98 upon actuation of the detector cell 58 is lowered to the proper value required by the transistor. A capacitor 108 is provided to connect the tank circuit of the oscillator 96 to ground in order to isolate the base of the transistor 98 from D.C. ground and to permit it to pass A.C.

The output of the secondary tuned circuit of the inductive signal link 64, consisting of the coil 62 and capacitor 110, is amplified by a transistor 112, the bias current for which is provided by a diode 114. The amplified signal passes through a coupling condenser 116 to a rectifier circuit comprising diodes 118 and 120, and the resulting D.C. is supplied to a D.C. amplifier transistor 122. Time constant circuits 124 and 126, each consisting of a resistor and a capacitor in parallel, are incorporated in the circuit across the base of transistor 122 to provide for rejection of sudden short transients produced by external signals in the same frequency range as the oscillator 96. The circuit to the primer 44 is completed by a power transistor 128 which functions as a switching means to control the current to said primer. The transistor 122 is biased far into cutoff to eliminate any possibility of triggering due to a rise of collector current due to thermal runaway. A diode 130 is placed in the collector lead of the transistor 122 to prevent triggering due to failure of the postive power supply. Resistors 131, 132, and 134 are provided in the primer firing circuit 66 to limit the voltage to ensure that the primer does not fire prematurely.

Under normal monitoring conditions the power transistor 128 will not be energized, and the only current passing through the primer 44 will be the current in the collector plate of said transistor, which is far below the amount of current required to cause firing or deterioration of said primer. Actuation of the photocell detector 58 will cause an increase in the current passing through the primer firing circuit, which will energize the transistor 122 to amplify the signal. This will result in a surge of current sufficient to energize the transistor 128 and fire the primer 44.

At the completion of an indexing movement of the missiles, each missile will be positioned over a water nozzle 28 housed in the stationary magazine base 26. The coils 52 and 60, in the extension ring 22, will be aligned with the coils 50 and 62, respectively, in the base 26. The axial spacing and alignment of the coils need not be exact but may vary within a prescribed tolerance without impairing the operability of the system.

In operation, light from combustion in an inadvertently ignited propellant grain will energize the photocell detector 58 which will then provide bias current for oscillator 96. The oscillator 96 will supply a signal through the inductive signal link 64 to the primer firing circuit 66 to fire the primer 44 and release the latch 42. Water under pressure in the bore 38 of nozzle 28 will then force open the clapper valve 40 and flow through the aligned hollow cylinder 20 and hollow plug 18. The water is under sufficient pressure to overcome the frangible nozzle closure cap 24 to reach the propellant grain and extinguish combustion therein. During the indexing movement of the missiles, the capacitor 94 will remain charged. Thus, if fire should occur while a missile is between water nozzle stations, a signal will be transmitted to the primer 44 of the next water nozzle upon the missile reaching that station.

Figure 3:
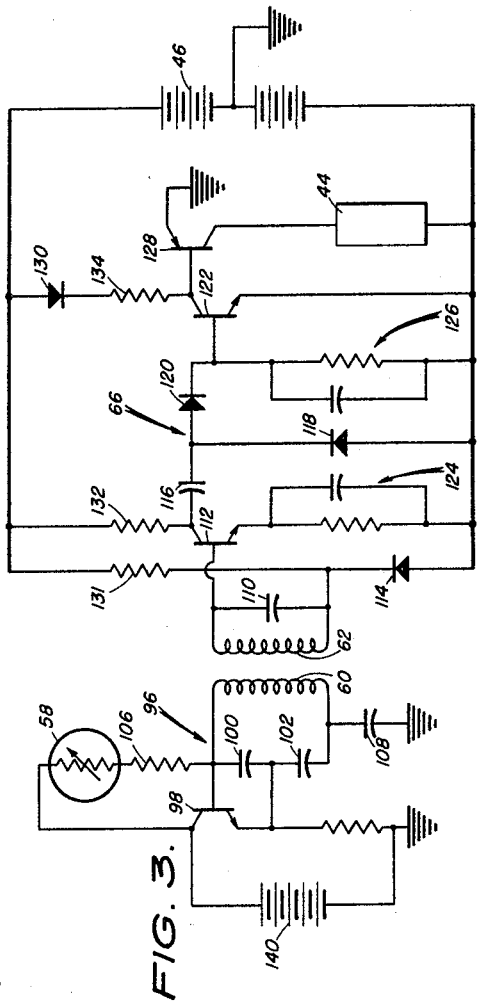
FIG. 3 is a wiring diagram of a slightly modified electrical circuit for the invention.

Referring to FIG. 3, a modified circuit is shown, wherein a battery 140 is substituted for the external oscillator circuit 48 and the conventional rectifier and filter circuit, shown in FIG. 2. The remainder of the circuit is identical to the corresponding circuitry shown in FIG. 2 and bears like reference numerals. The battery 140 may be mounted in the nozzle closure extension ring 22, thus providing a saving in weight as compared to the circuit of FIG. 2 since the battery is lighter than the coil 52. The battery 140 provides only enough voltage to satisfy the requirements of the transistor 33. Thus, in this arrangement, the sensitivity of the photocell would not be as great as in the first embodiment.

Obviously, many other modifications and variations of the present invention are possible in the light of the above disclosure. Therefore, it should be understood that within the scope of the appended claims the invention may be practiced otherwise than as specifically described.

What is claimed is:

1. In combination with a solid propellant rocket motor having an exhaust nozzle, a fire extinguishing system comprising, fire detector means mounted with said exhaust nozzle, a pressurized water supply means, a water nozzle connected to said water supply means and directed toward the solid propellant, valve means for normally preventing flow through said water nozzle, valve release means responsive to an electrical impulse, means for supplying electrical energy to said fire detector means, and transmitting means including a pair of induction coils for electrically connecting said valve release means with said fire detector means, whereby, upon combustion of the solid propellant the fire detector means will be energized for causing an impulse to be sent by said transmitting means to actuate said valve release means, thereby allowing water under pressure to flow through said water nozzle to extinguish the combustion.

2. In combination with a solid propellant rocket motor having an exhaust nozzle, a fire extinguishing system comprising, fire detector means mounted with said exhaust nozzle, a pressurized water supply means, a water nozzle connected to said water supply means and directed toward the solid propellant, valve means for normally preventing flow through said water nozzle, valve release means responsive to an electrical impulse, means for supplying electrical energy to said fire detector means, and an electric circuit connecting said detector means and said valve release means, said circuit including a first inductive coil mounted within said exhaust nozzle near the outer extremity thereof, and a second inductive coil positioned outside said exhaust nozzle and substantially aligned with said first inductive coil, whereby upon combustion of the solid propellant the detector means will be energized for causing an impulse to be sent through said circuit to actuate said valve release means, thereby allowing water under pressure to flow through said water nozzle to extinguish the combustion.

3. The combination according to claim 2, wherein the means for supplying electrical energy to the fire detector means includes a third inductive coil mounted within said exhaust nozzle near the outer extremity thereof, a fourth inductive coil positioned outside said exhaust nozzle and substantially aligned with said third inductive coil, a source of electrical energy connected to said fourth inductive coil, and a circuit connecting said third coil with said fire detector means.

4. The combination according to claim 2, wherein the means for supplying electrical energy to the fire detector means comprises a battery, and an electric circuit connecting said battery with said fire detector means.

5. In combination with a plurality of solid propellant rocket motors movably stored in a magazine, each of said rocket motors having an exhaust nozzle; a fire extinguishing system comprising fire detector means mounted within the exhaust nozzle of each rocket motor, means for supplying electrical energy to said fire detector means, pressurized water supply means, a plurality of water nozzles connected to said water supply means, each said water nozzle being mounted in a fixed support located adjacent the magazine and being directed toward the solid propellant of one of said rocket motors, valve means associated with each water nozzle for normally preventing flow therethrough, valve release means associated with each of said valve means and responsive to an electrical signal from said fire detector means, and means including a pair of induction coils for electrically connecting said valve release means to said fire detector means, whereby, upon combustion of a solid propellant, the fire detector means associated therewith will be energized, causing said valve release means to be actuated, thereby allowing water under pressure to flow through the associated water nozzle to extinguish the combustion.

6. In combination with a plurality of solid propellant rocket motors movably stored in a magazine, each of said rocket motors having an exhaust nozzle; a fire extinguishing system comprising fire detector means mounted within the exhaust nozzle of each rocket motor, pressurized water supply means, a plurality of water nozzles connected to said water supply means, each said water nozzle being mounted in a fixed support located adjacent the magazine and directed toward the solid propellant of each said rocket motor, valve means associated with each water nozzle for normally preventing flow therethrough, valve release means associated with each said valve means and responsive to an electrical impulse, means for supplying electrical energy to each of said fire detecting means, and an electrical circuit connecting each detecting means with a valve release means, each circuit including a first inductive coil mounted within each of said exhaust nozzles near the outer extremity thereof, and a second inductive coil carried by said fixed support and substantially aligned with said first inductive coil, whereby, upon combustion of a solid propellant the detector means associated therewith will be energized, causing an impulse to be sent through said circuit to actuate said valve release means, thereby allowing water under pressure to flow through the water nozzle to extinguish the combustion.

7. The combination according to claim 6, wherein the means for supplying electrical energy to each of said fire detector means includes a source of electrical energy located outside the exhaust nozzles, a third inductive coil mounted within each of said exhaust nozzles near the outer extremity thereof, a fourth inductive coil carried by said fixed support and substantially aligned with said third inductive coil, and an electric circuit connecting each of said inductive coils with one of said fire detector means.

8. The combination according to claim 6, wherein the means for supplying electrical energy to each of said fire detector means comprises a battery associated with each of said rocket motors, and an electric circuit connecting each of said batteries with one of said fire detector means.

9. In combination with a plurality of solid propellant rocket motors movably stored in a magazine, each said rocket motor having an exhaust nozzle; a fire extinguishing system comprising a frangible closure in each of said exhaust nozzles, an infrared detector mounted on the side of each of said closures facing the solid propellant, pressurized water supply means, a plurality of water nozzles connected to said water supply means, each said water nozzle being carried by a fixed support adjacent the magazine and being directed toward the solid propellant of each rocket motor, valve means associated with each of said water nozzles for normally preventing flow therethrough, valve release means associated with each of said valve means and responsive to an electrical impulse, means for supplying electrical energy to each of said infrared detectors, and an electrical circuit connecting each of said infrared detectors with its associated valve release means, each said circuit including a first inductive coil mounted within each of said exhaust nozzles near the outer extremity thereof, and a second inductive coil carried by said fixed support and substantially aligned with said first inductive coil, whereby, upon combustion of one of said solid propellants the infrared detector will be energized to cause an electric impulse to be sent through said circuit, thereby actuating the valve release means and allowing water under pressure to flow through the water nozzle to remove said frangible closure and extinguish the combustion.

10. The combination according to claim 9, including illuminating means mounted in each of said exhaust nozzles, whereby energization of said illumination means will energize said infrared detectors for the purpose of testing the system.

References Cited in the file of this patent
UNITED STATES PATENTS

| | | |
|---|---|---|
| 2,389,817 | Rider | Nov. 27, 1945 |
| 2,799,136 | De Boisblanc | July 13, 1957 |
| 2,949,009 | D'Ooge | Aug. 16, 1960 |
| 2,989,124 | Lapp et al. | June 20, 1961 |